United States Patent [19]

Mueller et al.

[11] Patent Number: 4,922,374

[45] Date of Patent: May 1, 1990

[54] LIGHTNING PROTECTOR ASSEMBLY

[75] Inventors: Scott Mueller, South Barrington; Richard Heidorn, Lombard; E. Grant Swick, Bartlett, all of Ill.

[73] Assignee: Illinois Tool Works, Inc., Chicago, Ill.

[21] Appl. No.: 309,303

[22] Filed: Feb. 10, 1989

[51] Int. Cl.[5] ............................................... H02H 1/00

[52] U.S. Cl. .................................... 361/119; 361/111; 361/124; 361/127; 361/394; 361/431; 361/432

[58] Field of Search ................... 361/56, 91, 117, 118, 361/119, 124, 126, 127, 392, 394, 400, 430, 431, 432; 379/331, 412

[56] References Cited

U.S. PATENT DOCUMENTS 4,563,720 1/1986 Clark ............................... 361/119 X 4,654,743 3/1987 Ruehl et al. ......................... 361/111

*Primary Examiner*—Derek S. Jennings

*Attorney, Agent, or Firm*—Schwartz & Weinrieb

[57] ABSTRACT

A lightning protector assembly for telephone circuitry and the like includes a housing formed of a lower necked terminal section and an upper expanded grounding section. A component-mounting member is disposed within the housing for mounting a first pair of voltage limiting devices and a first pair of impedance devices. There are cavities provided in the lower part of the component-mounting member for receipt of a plurality of terminal contacts. The upper section has a pair of top recesses separated by a central bridging portion. Plug-in fuse holder units are disposed within the top recesses. A side ground contact is provided and includes an elongated horizontal member extending inside and across the width of the housing for connection to the first pair of voltage limiting means and a portion thereof extending externally of the housing.

21 Claims, 6 Drawing Sheets

LIGHTNING PROTECTOR ASSEMBLY

FIELD OF THE INVENTION

This invention relates generally to transient voltage protector packages, and more particularly, it relates to a lightning protector assembly having a two-piece interfitting housing which provides a structure for receiving four contact terminals, a component-mounting member, a side ground contact, first and second pairs of voltage limiting devices, first and second pairs of impedance devices, and a pair of plug-in fuse units.

BACKGROUND OF THE INVENTION

In U.S. Pat. No. 4,554,609 issued on Nov. 19, 1985, in the names of the inventors William E. Ruehl, Richard E. Heidorn and Edwin G. Swick, and entitled "Transient Voltage Protector," and which is assigned to the same assignee as this invention, there is shown and described a transient voltage protector which includes a plastic housing formed of two-pieces that telescope in part. The housing consists of a terminal portion containing four sheet metal terminals and a grounding portion containing only a single pair of voltage limiting devices, such as, for example, Zener diodes. However, while shorting gas tubes are typically used in connection with such voltage protectors, they were provided externally of the housing.

In U.S. Pat. No. 4,654,743 issued on Mar. 31, 1987, which was a continuation-in-part application of a parent application that matured into the '609 patent, there is shown and described a modification of the '609 patent in which the housing therein was adapted so as to internally enclose the gas tubes. Furthermore, the '743 patent discloses an external resistor assembly which is adapted as a plug-in assembly in connection with the housing. This latter patent also teaches the arrangement of fuses, which in accordance with conventional practice had located the fuses remotely of the housing, to be disposed within the housing via plug-in fuse units. In addition, there is provided a side ground connector which interfits with a mounting member and extends through the housing via suitable slots therein. The side ground connector is connected to the sheet metal ground contacts by means of a ground wire, which extends across the mounting member, so as to provide ground potential to the ground contacts.

GENERAL SUMMARY OF THE INVENTION

The present invention represents additional improvements over the transient voltage protectors described above in connection with the '743 patent. In the present invention, the resistors are fixedly mounted internally of the housing along with the internally-mounted Zener diodes and gas tubes. The housing is also adapted to accommodate additional impedance devices comprising a pair of inductors. The housing includes a pair of top recesses for receiving plug-in fuse units. Furthermore, a side ground contact has been provided to include an elongated horizontal member so as to eliminate the need of a ground wire extending across the mounting member.

OBJECTS OF THE INVENTION

Accordingly, it is a general object of the present invention to provide a novel and improved lightning protector assembly which is relatively simple and economical to manufacture and assemble.

It is an object of the present invention to provide a lightning protector assembly having a two-piece interfitting housing for receiving four contact terminals, a component-mounting member, a side ground contact, first and second pairs of voltage limiting devices, first and second pairs of impedance devices, and a pair of plug-in fuse units.

SPECIFIC SUMMARY OF THE INVENTION

In the embodiment of the present invention, there is provided a lightning protector assembly for telephone circuitry and the like which includes a housing formed of a lower necked terminal section and an upper expanded ground section. A component-mounting member is disposed within the housing for mounting a pair of voltage limiting devices and a pair of impedance devices. There are cavities provided within the lower part of the component-mounting member for receipt of a plurality of terminal contacts. The upper section of the housing includes a pair of top recesses separated by means of a central bridging portion. A pair of plug-in fuse units are disposed within the top recesses. A side ground contact is provided and includes an elongated horizontal member extending inside and across the width of the housing for connection to the pair of voltage limiting devices and a portion thereof extends externally of the housing.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout the severals views, wherein.

DESCRIPTION OF THE PREFERRED EMBODIMENT

Figure 1:
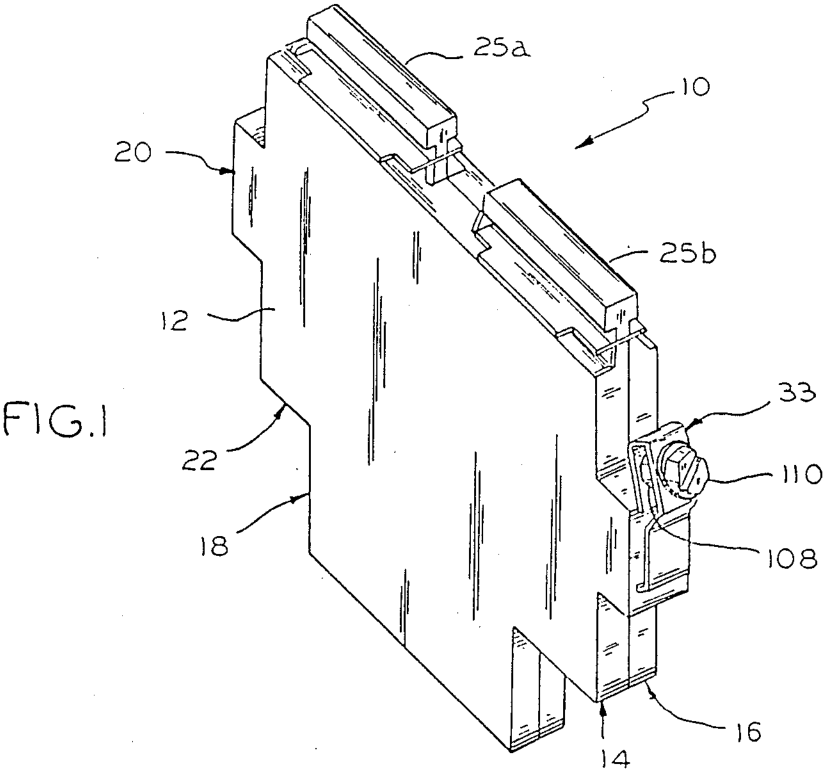
FIG. 1 is a perspective view of a lightning protector assembly, constructed in accordance with the principles of the present invention.

Referring now in detail to the various views of the drawings and in particular to FIGS. 1-5, there is shown a lightning protector assembly of the present invention which is designated generally by reference numeral 10 and suitably interconnects with a split 66-M terminal block (not shown) in common use in telephone circuitry and other electronic applications. The lightning protector assembly 10 includes a plastic housing 12 made of a suitable material such as, for example, clear polycarbonate and is comprised of two co-mating front and back halves 14 and 16. The two halves are substantially mirror images of each other and are ultimately sonically welded together. The housing 12 includes a lower necked terminal section 18 and an upper expanded grounding section 20 which is joined integrally to the terminal section 18 at shoulders 22.

The lower terminal section 18 is adapted to be plugged into the split 66-M terminal block during use. The upper grounding section 20 includes a pair of top recesses 23*a*, 23*b* separated by means of a central bridging portion 24. The recesses 23*a*, 23*b* are provided for the receipt of corresponding plug-in fuse holder units 25*a* and 25*b*, as will be explained more fully hereinafter.

Figure 3:
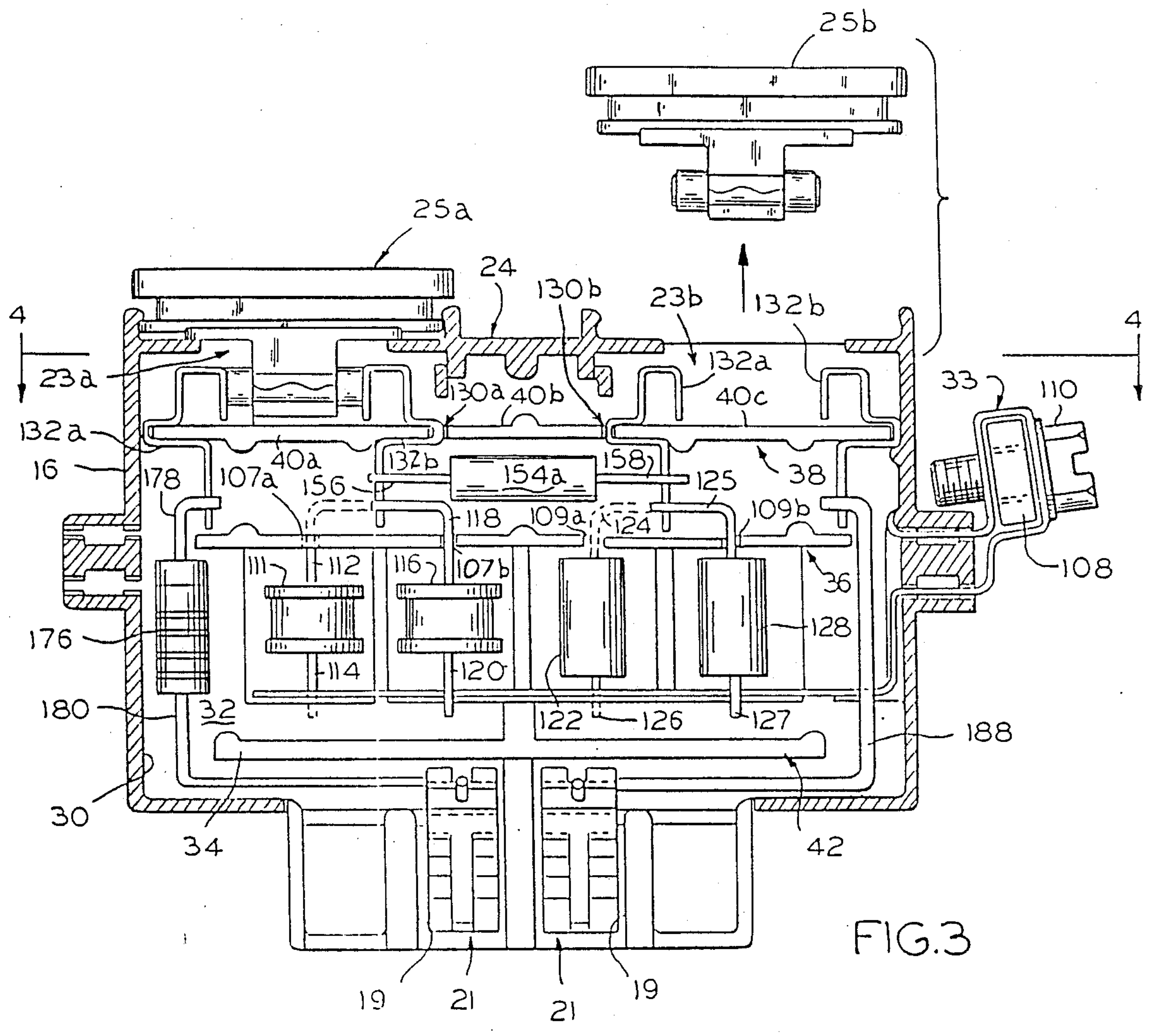
FIG. 3 is a front view of the back half and component-mounting member of the protector assembly of FIG. 2.

The front and back halves 14 and 16 are provided with outer confronting and interfitting wall members 26 and 28, respectively. The wall members 26 and 28 are recessed at 30 so as to receive and enclose a component-mounting member 32. A side ground contact 33 is provided for reasons that will become apparent which interfits with the component-mounting member 32 and which extends through the housing 12 by means of suitable slots formed therein. The lower part of the component-mounting member 32 is provided with vertical cavities 19 for receiving therein four terminal contacts 21. The component-mounting member 32 includes three, vertically spaced horizontal layers 34, 36 and 38 extending between the top and bottom of the grounding section 20 as shown in FIG. 3. The first layer 34 includes undersurface portions 42 which are positioned above the upper ends of the four terminal contacts 21.

Figure 2:
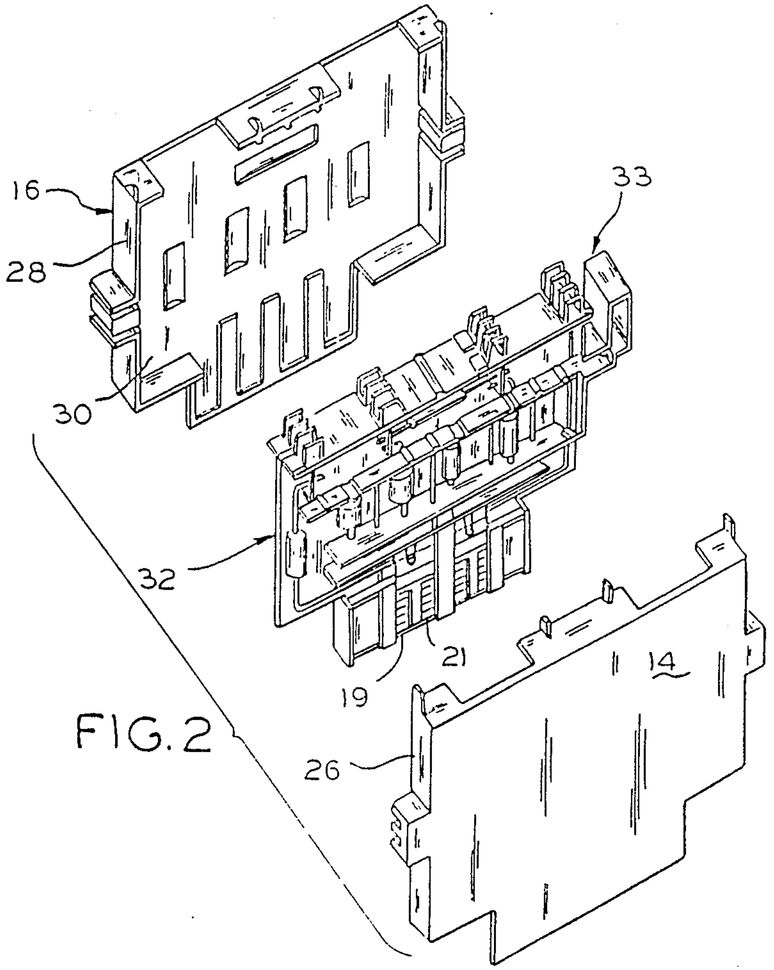
FIG. 2 is an exploded perspective view of the lightning protector assembly of FIG. 1, with the fuse holder units removed.
Figure 5:
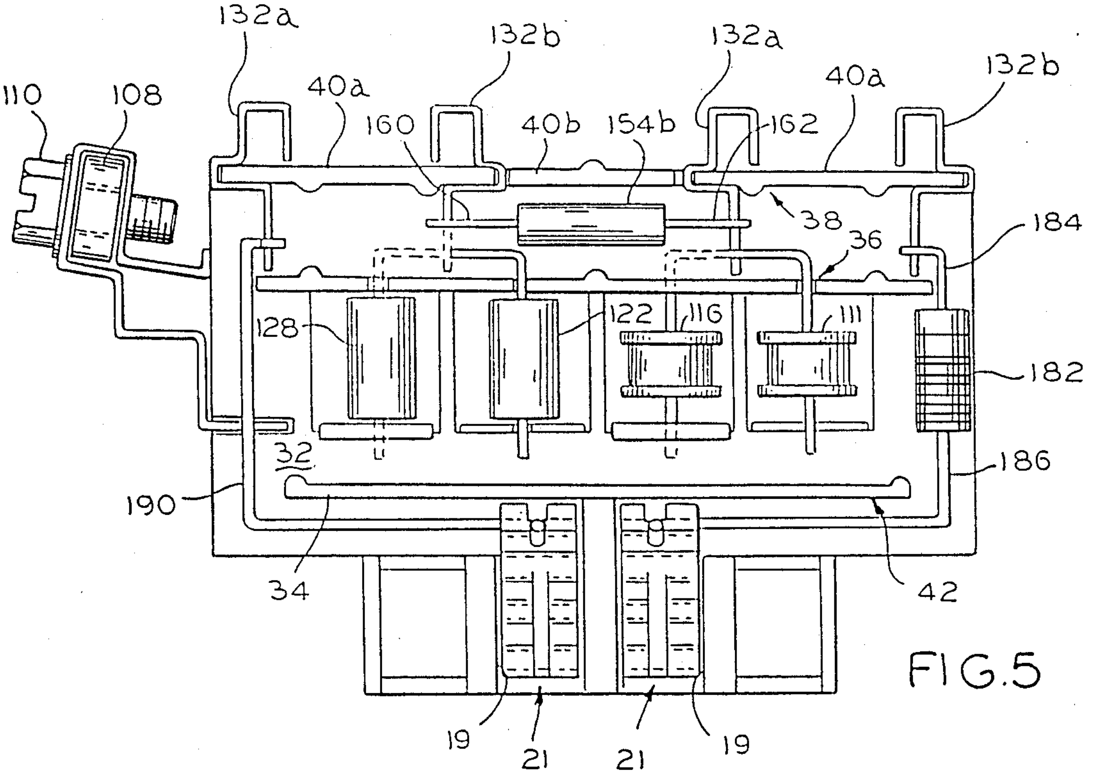
FIG. 5 is a back view thereof, taken along the lines 5—5 of FIG. 4.
Figure 6:
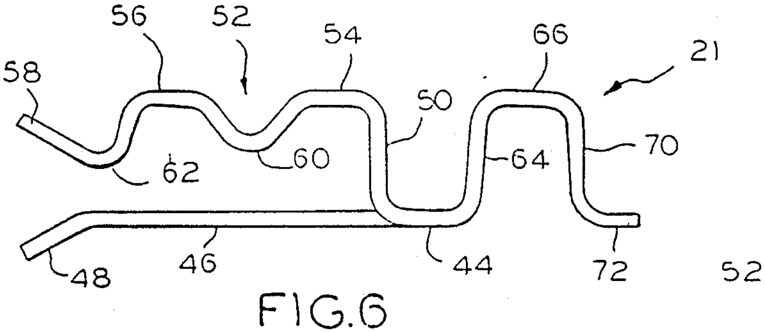
FIG. 6 is a side view of one of the terminal contacts forming a part of the present invention.
Figure 8:
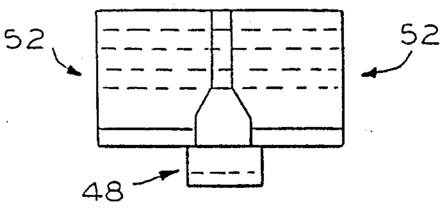
FIG. 8 is an end view of the terminal contact of FIG. 6.
Figure 7:
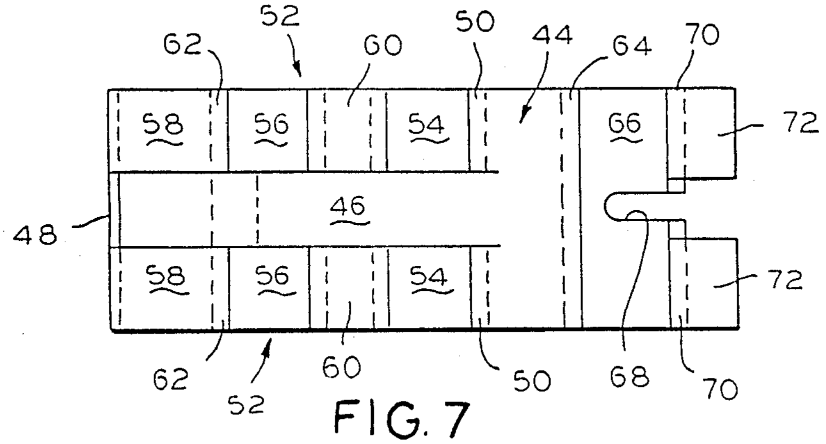
FIG. 7 is a front view of the terminal contact of FIG. 6.

The terminal contacts 21 shown in FIGS. 2, 3 and 5 are all identical and one of them in shown in full detail in FIGS. 6-8. The terminal contacts are preferably formed of phosphor-bronze and are solder tinned. Each of the terminal contacts 21 comprises an integral sheet metal stamping and includes a flat body portion 44 having a single narrow leg 46 extending therefrom in a co-planer relationship relation and having an outwardly deflected tip 48. Two offsets 50, each having a leg 52 thereon, are disposed on each side of the leg 46. The legs 52 are arranged in a parallel and spaced apart relationship with respect to the leg 46. Each of the legs 52 is formed so as to have a first flat portion 54, a second flat portion 56, and an outwardly directed tip 58. A first concave portion 60 joins the first and second flat portions 54 and 56 together. A second concave portion 62 joins the outwardly directed tip 58 and the second flat portion 56 together.

At the opposite or upper edge of the flat body portion 44, there is provided an offset strip 64 which is parallel to but spaced from the offsets 50. A wire receiving portion 66 is disposed in co-planar relationship with the legs 52 and extends from the end of the offset strip 64. A U-shaped notch 68 is formed in the intermediate area of the portion 66. A pair of offsets 70 extend from the ends of the portion 66 and are spaced in parallel with respect to the offset strip 64. A connecting portion 72 is joined to each end of the offsets 70 and is co-planar with the narrow leg 46. A wire or component lead is engaged or gripped within a portion of the U-shaped notch 68 that extends into the offsets 70.

Figure 11:
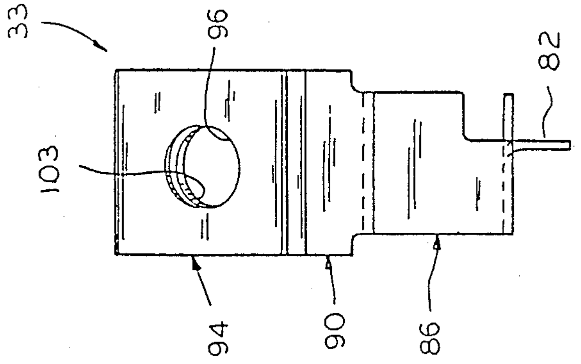
FIG. 11 is an end view of the side ground contact of FIG. 9, taken along the lines 11—11 of FIG. 9.

The first layer 34 of the mounting member 32 is disposed below the side ground contact 33. The side ground contact is stamped from sheet metal and is likewise preferably made of phosphor-bronze and solder plated similar to the terminal contacts 21. The ground contact 33 is shown in FIGS. 2, 3 and 5 and is illustrated in full detail in FIGS. 9-11. In the latter, the ground contact 33 can be seen to include an elongated horizontal member 74 which is disposed above the top surface of the first layer 34 of the mounting member 32 and extends generally inside and across the width of the housing 12.

The horizontal member 74 is provided with a first pair of oppositely extending slots or notches 76*a*, 76*b* adjacent the left end thereof (as viewed from FIG. 10) for receiving therein terminal leads of electrical components. Furthermore, the horizontal member 74 is provided with a second pair of oppositely extending slots or notches 78*a*, 78*b* adjacent the right end thereof for receiving therein terminal leads of other electrical components. A depending flange 80 extends downwardly from the horizontal member opposite the slot 76*b*. A depending flange 82 extends downwardly from the horizontal member opposite the slot 78*b*. A plurality of grooves 83 are formed within the horizontal member 74 and interfit with portions of the mounting member 32 so as to provide stabilized engagement therewith.

Figure 9:
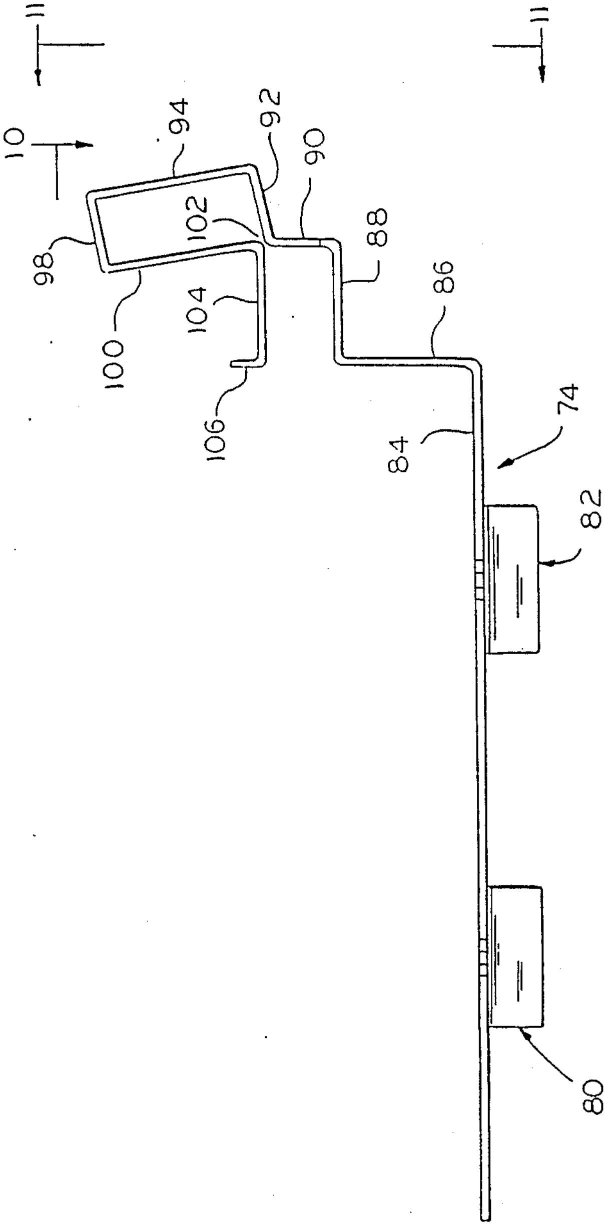
FIG. 9 is a side view of the side ground contact.
Figure 10:
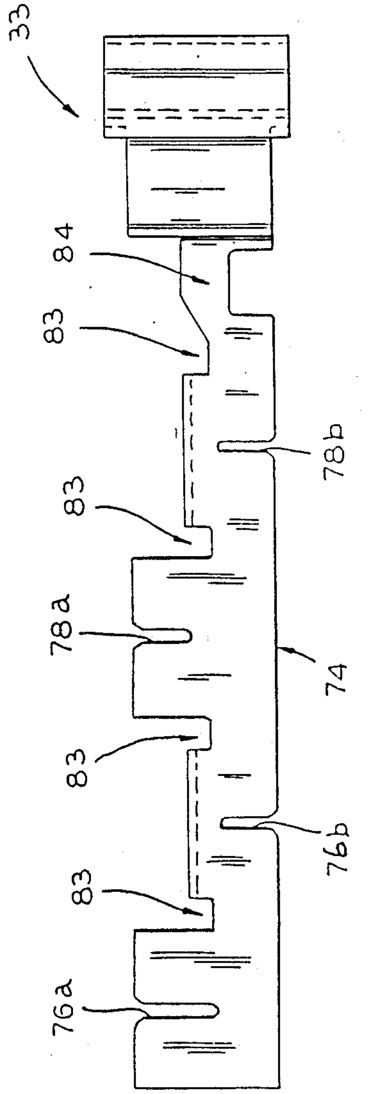
FIG. 10 is a top view of the side ground contact of FIG. 9, taken along the lines 10—10 of FIG. 9.

As can be seen from FIG. 9, the horizontal member 74 has a relatively narrow portion 84 at its right end which integrally connects with an offset 86 and is perpendicular thereto. At the upper end of the offset 86, there is connected integrally thereto a horizontal bottom wall 88 which extends outwardly therefrom. An upstanding flange 90 extends along the right end of the horizontal bottom wall 88 at right angles thereto. An angularly-disposed connecting flange 92 is joined integrally to the upper end of the upstanding flange 90 and extends outwardly therefrom. At the right end of the connecting flange 92, a sloping wall 94 is joined integrally thereto, which has a central aperture 96. At the upper end of the sloping wall 94, there is disposed a connecting flange 98 extending to the left thereof in a parallel relationship with respect to the connecting flange 92.

A sloping wall 100 is connected integrally at the left end of the connecting flange 98 and is parallel to and spaced apart from the sloping wall 94. A gap 102 is formed between the lower end of the sloping wall 100 and the upper end of the upstanding flange 90. A central aperture 103 is provided within the sloping wall 100 which is aligned with the aperture 96. Furthermore, a horizontal top wall 104 is joined integrally to the lower end of the sloping wall 100 and is parallel to and spaced apart from the horizontal bottom wall 88. The horizontal top wall 104 has at its left end a short outwardly extending flange 106 which is co-planar with the offset 86.

A square nut 108 is received within the area defined by means of the sloping walls 94, 100 and horizontal walls 92, 98. A screw 110 extends initially through the aperture 96 defined within the sloping wall 94 and is threaded through the nut 108. Then, the screw extends through the aperture 103 defined within the sloping wall 100. A common ground bus (not shown) may be readily connected to the head of screw 110.

The second layer 36 of the mounting member 32 includes a first pair of guiding slots **107*a*, 107*b* which are disposed upon opposite sides thereof and a second pair of slots 109*a*, 109*b*. The slot 109*a* is arranged upon the same side as the slot 107*a*, and the slot 109*b* is positioned upon the same side as the slot 107*b*. The slots 107*a*, 107*b*, 109*a* and 109*b* are vertically aligned with the respective slots 76*a*, 76*b*, 78*a* and 78*b* defined within the horizontal member 74 of the side ground contact 33**.

A first transient voltage limiter device 111, such as, for example, a gas tube, has its terminal leads 112, 114 mounted within the respective slots **107*a* and 76*a*. A second transient voltage limiter device 116 similar to the limiter device 111 has its terminal leads 118, 120 mounted within the respective slots 107*b* and 76*b*. These gas tubes 111 and 116 may be, for example, LUMEX GT-BG145L. A third transient voltage device 122, such as, for example, a Zener diode, has its terminal leads 124, 126 mounted within the respective slots 109*a* and 78*a*. A fourth transient voltage limiter device 128 similar to the limiter device 122 has its terminal leads 125, 127 mounted within the respective slots 109*b* and 78*b*. These Zener diodes 122 and 128** may be of the type sold by General Semiconductor as their part No. TRANSZORB 1.5 KE27C.

The third layer 38 of the mounting member 32 comprises a left-hand portion **40*a*, a mid-portion 40*b*, and a right-hand portion 40*c* as illustrated in FIG. 3. The portions 40*a* and 40*c* are spaced apart from the mid-portion 40*b* by means of respective openings 130*a*, 130*b*. Each opposite end of the left-hand portion 40*a* serves to mount a pair of fuse contacts 132*a*, 132*b*. Similarly, each opposite end of the right-hand portion 40*c* serves to mount an additional pair of fuse contacts 132*a*, 132*b***.

Figure 4:
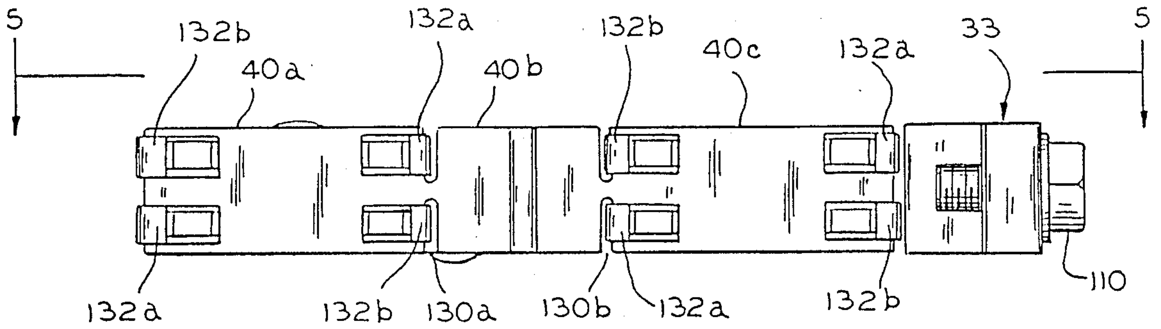
FIG. 4 is a top view thereof, taken along the lines 4—4 of FIG. 3.
Figure 12:
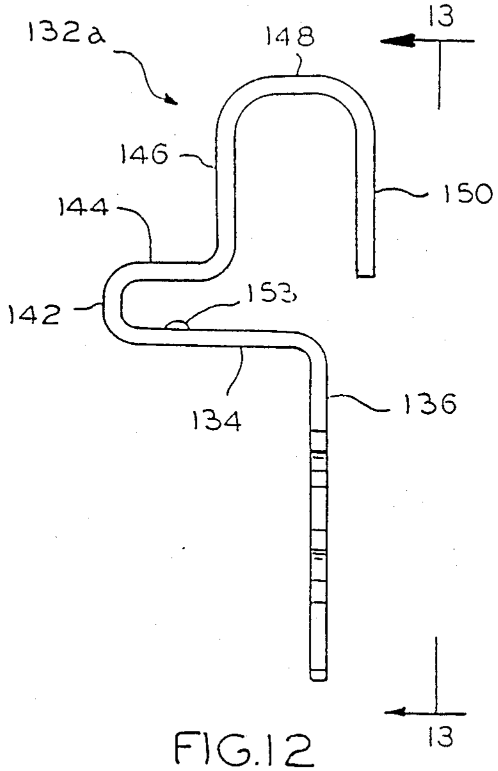
FIG. 12 is a side view of the fuse contact 132*a* forming a part of the present invention.
Figure 13:
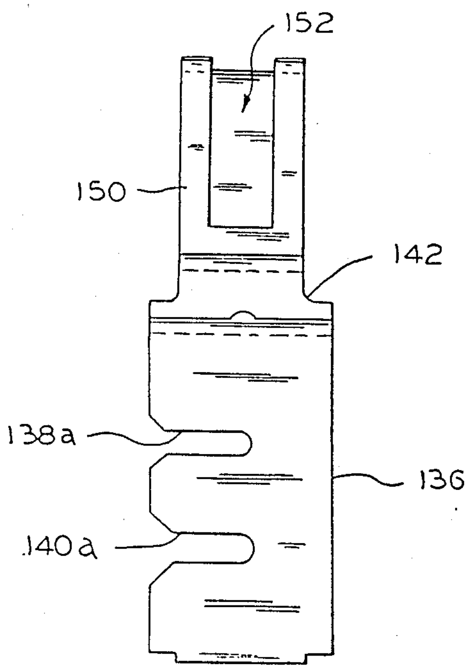
FIG. 13 is a front view of the fuse contact of FIG. 12, taken along the lines 13—13 of FIG. 12.
Figure 14:
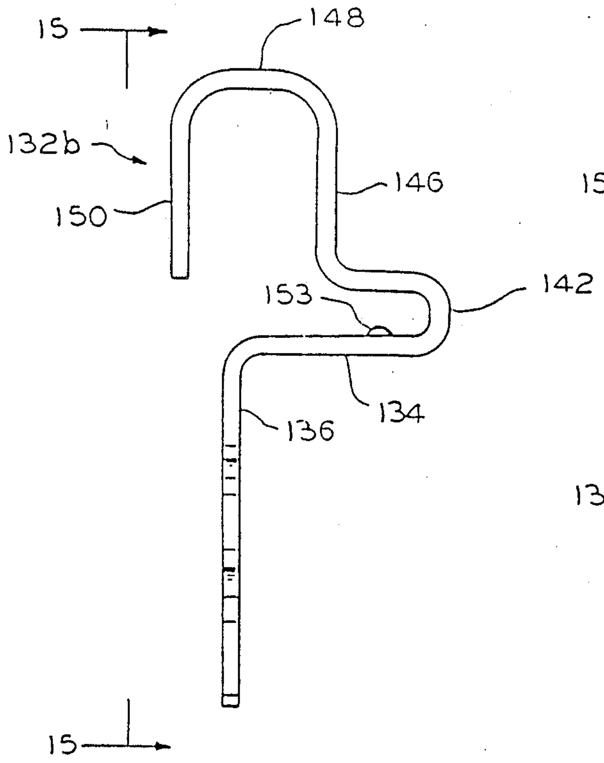
FIG. 14 is a side view of the fuse contact 132*b* forming a part of the present invention.
Figure 15:
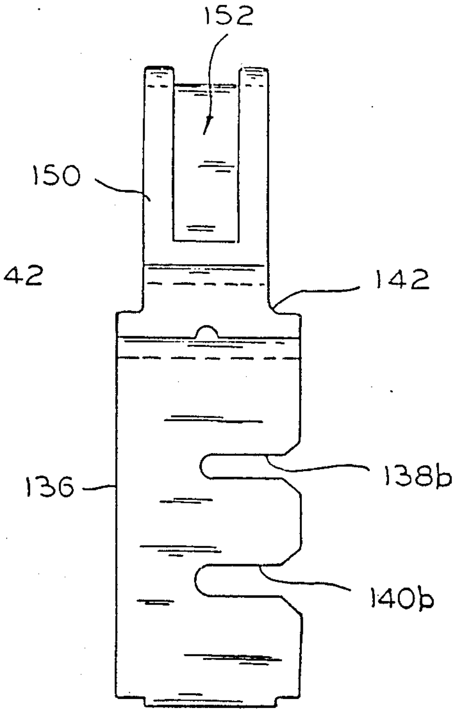
FIG. 15 is a side view of the fuse contact of FIG. 14, taken along the lines 15—15 of FIG. 14.

The fuse contacts **132*a*, 132*b* depicted generally in FIGS. 2, 4 and 5 are specifically illustrated in detail in FIGS. 12–15. The fuse contact 132*a* is shown in FIGS. 12 and 13, and the fuse contact 132*b* is shown in FIGS. 14 and 15. The fuse contact 132*a* includes a horizontal bottom wall member 134 which has connected integrally at its right end (as viewed in FIG. 12) a vertically dependent wall member 136. The top surface of the bottom wall member 134 may be provided with a dimple 153 so as to better engage the portions 40*a* and 40*c*. The wall member 136 is formed with an upper horizontally-extending aperture 138*a* and a lower horizontally-extending aperture 140*a*, both apertures being formed upon the left side of the wall member 136. At the opposite or left end of the horizontal wall member 134, there is provided a bight portion 142 which has connected integrally at its upper end a horizontal top wall 144. The top wall 144 extends only between the middle and left end of the bottom wall 134 in a parallel and spaced apart relationship. A vertical wall 146 is joined integrally to the right end of the top wall 144. At the upper end of the vertical wall 146, there is provided bight section 148 which is connected integrally thereto. A vertical wall 150 is connected integrally to the right end of the bight section 148 and extends downwardly to the level of the horizontal top wall 144. A rectangularly-shaped cut-out 152 is defined within the bight section 148 and the vertical wall 150**.

Referring now to FIGS. 14 and 15, it can be seen that the fuse contact **132*b* is substantially identical to the fuse contact 132*a* where like reference numerals have been used to designate like parts. It will be noted that the only difference resides in the upper horizontally-extending aperture 138*b* and lower horizontally-extending aperture 140*b* of the fuse contact 132*b*, both of which are formed upon the right side of the wall member 136 rather than upon the left side as was the case with the fuse contact 132*a***.

The distal ends of the terminal leads 112 and 118 of the respective voltage limiter devices 111, 116 interfit snugly within the respective lower apertures **140*a* and 140*b* of the fuse contacts 132*a*, 132*b* engaging the right end of the left-hand portion 40*a*. Similarly, the distal ends of the terminal leads 124, 125 of the voltage limiter devices 122 and 128 interfit snugly within the respective lower apertures 140*b* and 140*a* of the fuse contacts 132*b* and 132*a* engaging the left end of the right-hand portion 40*c***.

In the past, it has been a common practice to locate resistors entirely exterior of the housing and preferably arranged for plug-in assembly with the housing. In the embodiment of the present invention, first and second resistors **154*a*, 154*b* are disposed completely within the housing 12. In particular, the resistor 154*a* has its terminal leads 156, 158 mounted snugly between the upper apertures 138*b* and 138*a* of the respective fuse contacts 132*b*, 132*a*. Similarly, the resistor 154*b* has its terminal leads 160, 162 mounted snugly between the upper apertures 138*b* and 138*a* of the respective fuse contacts 132*b*, 132*a*. It should be understood that the resistors 154*a* and 154*b*** could be replaced with other impedance devices, such as, for example, inductors.

Figure 16:
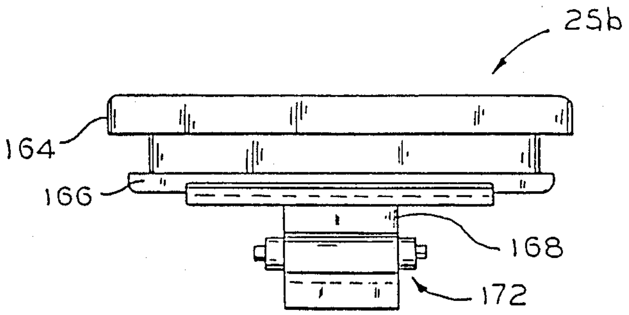
FIG. 16 is an enlarged side view of the fuse holder unit.
Figure 17:
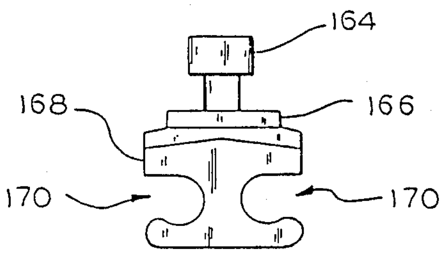
FIG. 17 is an end view of the fuse holder unit of FIG. 16.

The fuse holder units **25*a* and 25*b* shown generally in FIG. 1 are depicted in more detail in FIGS. 16 and 17. Since the fuse holder units 25*a* and 25*b* are identical in construction, it will suffice to describe only the details of the fuse holder 25*b* shown in FIGS. 16 and 17. It should be clear that the fuse holder units are designed for plug-in assembly with the housing 12. Specifically, the fuse holder 25*b* includes a handle member 164, a covering top plate 166 formed integrally with the handle member 164, and a slightly smaller body portion 168 depending from the top plate 166. The top recesses 23*a*, 23*b* of the housing 12 are of a proper size so as to receive the body portion 168. The body portion 168 is provided with a pair of recesses defined within opposite side surfaces thereof 170 for receiving and retaining fuses 172. The vertical walls 150 of the opposed fuse contacts engage snugly the ends of the fuses 172 when the handle member 164 is gripped for insertion of the fuses into the recesses 23*a*, 23*b* of the housing 12**.

An optional third impedance device 176, such as, for example, an inductor or resistor, is mounted within the left side of the housing and has its terminal leads 178, 180 mounted between the lower aperture **140*a* of the fuse contact 132*a* and the U-shaped notch 68 of one of the terminal contacts 21. Similarly, an optional fourth impedance device 182 similar to the inductor 176 has its terminal leads 184, 186 mounted between the lower aperture 140*b* of the fuse contact 132*b* and the U-shaped notch 68 defined within another terminal contact 21. Within the right side of the housing 12, a jumper wire 188 is connected between the lower aperture 140*b* of the fuse contact 132*b* and the notch 68 defined within another terminal contact 21. Similarly, a jumper wire 190 is connected between the lower aperture 140*a* in of the fuse contact 132*a* and the notch 68 of another terminal contact 21. If the first and second impedance devices 154*a* and 154*b* are inductors, then the third and fourth inductors 176, 182 may be eliminated entirely and replaced by means jumper wires similar to the wires 188, 190**.

Figure 18:
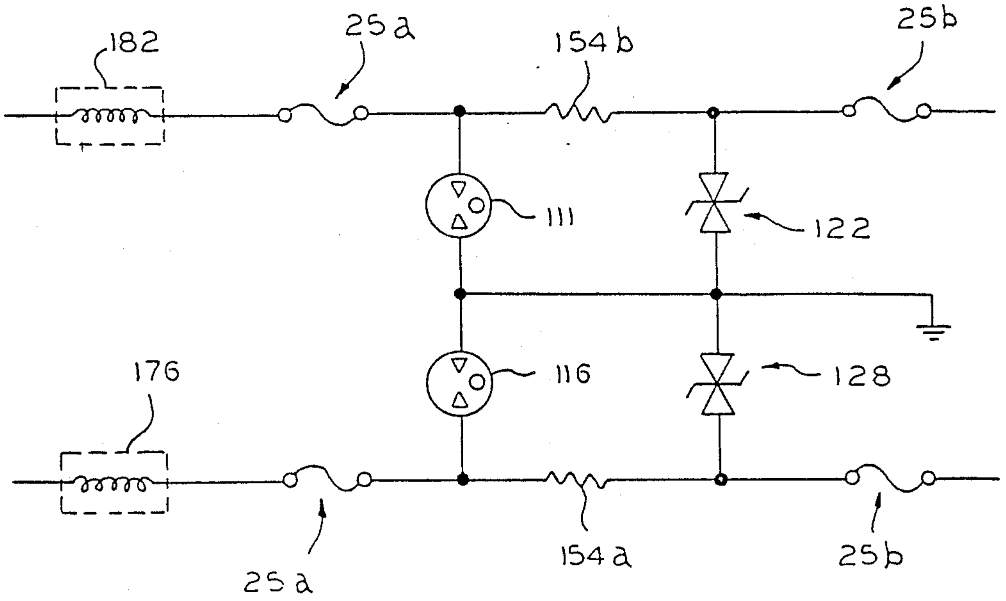
FIG. 18 is a schematic circuit diagram of the invention of FIG. 1.

The component-mounting member 32 with all of the parts mounted (except for the fuse holder units with fuses) is positioned as shown in FIG. 2 between the two halves 14 and 16 of the plastic housing 12. Then, the halves are brought together so as to sandwich the member 32 therebetween. A sonic welding process is used to fixedly secure the two halves of the housing together. Finally, the fuse holder units **25*a*, 25*b* with the fuses 172 are installed within the recesses 23*a*, 23*b* of the housing 12. As a result, an electrical circuit for the lightning protector assembly of FIG. 1 is formed and is illustrated in the schematic circuit diagram of FIG. 18**.

From the foregoing detailed description, it can thus be seen that the present invention provides an improved lightning protector assembly having a two-piece interfitting housing which provides a structure for receiving four contact terminals, a component-mounting member, a side ground contact, first and second pairs of voltage limiting devices, first and second pairs of impedance devices, and a pair of plug-in fuse holder units. The housing is formed of a pair of co-mating front and back halves for sandwiching a component-mounting member therebetween. A sonic welding process is used to fixedly secure the halves of the housing together. Thereafter, the fuse holder units are installed within the top recesses formed within the upper section of the housing, thereby providing a complete single unit.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A lightning protector assembly for telephone circuitry and the like, comprising:

housing means formed of a lower necked termimal section and an upper expanded ground section;

component-mounting means, having a front surface and a rear surface, disposed within said housing means for mounting a first pair of voltage limiting component means and a first pair of impedance component means;

a lower part of said component-mounting means having cavity means defined therein for receipt of a plurality of terminal contacts;

said upper section of said housing means having a pair of top recesses defined therein which are separated by means of a central bridging portion;

plug-in fuse means being disposed within said top recesses of said housing means; and side ground contact means, including an elongated horizontal member extending inside and across the width of said housing means along only one of said front and rear surfaces of said component-mounting means for connection to said first pair of voltage limiting means, and a terminal contact portion thereof extending externally of said housing means, wherein said elongated horizontal member and said terminal contact portion comprises a single-piece member.

2. A lightning protector assembly as claimed in claim 1, wherein said housing means includes a pair of co-mating front and back halves and wherein said component-mounting means is disposed between said front and back halves.

3. A lightning protector assembly as claimed in claim 1, further comprising a second pair of voltage limiting means mounted within said component-mounting means.

4. A lightning protector assembly as claimed in claim 3, wherein said first pair of impedance means is connected between said first and second pairs of voltage limiting means.

5. A lightning protector assembly as claimed in claim 4, wherein said first pair of impedance means comprises a pair of resistors.

6. A lightning protector assembly as claimed in claim 4, wherein said first pair of impedance means comprises a pair of inductors.

7. A lightning protector assembly as claimed in claim 3, further comprising a second pair of impedance means disposed within said housing means.

8. A lightning protector assembly as claimed in claim 7, wherein said fuse means includes a first pair of fuses interconnected between a first end of said first pair of impedance means and a first end of said second pair of impedance means, and a second pair of fuses interconnected between a second end of said first pair of impedance means and a first pair of terminal contacts.

9. A lightning protector assembly as claimed in claim 8, wherein a second end of said second pair of impedance means is connected to a second pair of terminal contacts.

10. A lightning protect assembly for telephone circuitry and the like, comprising:

housing means formed of a lower necked terminal section and an upper expanded grounding section;

component-mounting means, having a front surface and a rear surface, disposed within said housing means for mounting a first pair of voltage limiting component means and a first pair of impedance component means;

a lower part of said component-mounting means having cavity means defined therein for receipt of a plurality of terminal contacts;

said upper section of said housing means having a pair of top recesses defined therein which are separated by means of a central bridging portion;

plug-in fuse means being disposed within said top recesses of said housing means;

side ground contact means, including an elongated horizontal member extending inside and across the width of said housing means along only one of said front and rear surfaces of said component-mounting means, and a terminal contact portion disposed externally of said housing means, wherein said elongated horizontal member and said terminal contact portion comprise a single-piece member, for connecting said first pair of voltage limiting means to an external common bus; and said component-mounting means including a plurality of horizontal layers extending between a top region of said housing means and a bottom region of said housing means.

11. A lightning protector assembly as claimed in claim 10, wherein said housing means includes a pair of co-mating front and back halves and wherein said component-mounting means is disposed between said front and back halves.

12. A lightning protector assembly as claimed in claim 10, further comprising a second pair of voltage limiting means mounted within said component-mounting means.

13. A lightning protector assembly as claimed in claim 12, wherein said first pair of impedance means is connected between said first and second pairs of voltage limiting means.

14. A lightning protector assembly as claimed in claim 12, further comprising a second pair of impedance means disposed within said housing means.

15. A lightning protector assembly as claimed in claim 14, wherein said fuse means includes a first pair of fuses interconnected between a first end of said first pair of impedance means and a first end of said second pair of impedance means, and a second pair of fuses interconnected between a second end of said first pair of impedance means and a first pair of terminal contacts.

16. A lightning protector assembly as claimed in claim 15, wherein a second end of said second pair of impedance means is connected to a second pair of terminal contacts.

17. A lightning protector assembly for telephone circuitry and the like, comprising:

housing means formed of a terminal section and a grounding section;

component-mounting means, having a front surface and a rear surface, disposed within said housing means for mounting a first pair of voltage limiting component means and a first pair of impedance component means;

a lower part of said component-mounting means having cavity means defined therein for receipt of a plurality of terminal contacts;

said grounding section of said housing means having a pair of top recesses defined therein which are separated by means of a central bridging portion; plug-in fuse means being disposed within at least one of said top recesses of said housing means;

side ground contact means, including an elongated horizontal member extending inside and across the width of said housing means along only one of said front and rear surfaces of said component-mounting means for connection to said first pair of voltage limiting means, and a terminal contact portion thereof extending externally of said housing means, wherein said elongated horizontal member and said terminal contact portion comprises a single-piece member; and said elongated horizontal member having a plurality of grooves interfitting with portions of said component-mounting means so as to provide stabilized engagement therewith and having a plurality of slots for receiving therein terminal leads of said first pair of voltage limiting means and said first pair of impedance means.

18. A lightning protector assembly as claimed in claim 17, wherein said housing means includes a pair of co-mating front and back halves and wherein said component-mounting means is disposed between said front and back halves.

19. A lightning protector assembly as claimed in claim 17, further comprising a second pair of voltage limiting means mounted within said component-mounting means.

20. A lightning protector assembly as claimed in claim 19, further comprising a second pair of impedance means disposed within said housing means.

21. A lightning protector assembly for telephone circuitry and the like, comprising:

housing means formed of a terminal section and a grounding section;

component-mounting means, having a front surface and a rear surface, disposed within said housing means for mounting voltage limiting component means and impedance component means;

a lower part of said component-mounting means having cavity means defined therein for receipt of a plurality of terminal contacts;

at least one plug-in fuse unit being disposed within said grounding section of said housing means; and side ground contact means, including an elongated horizontal member extending inside and across the width of said housing means along only one of said front and rear surfaces of said component-mounting means for connection to said voltage limiting means, and a terminal contact portion thereof extending externally of said housing means, wherein said elongated horizontal member and said terminal contact portion comprise a single-piece member.

* * * * *